UNITED STATES PATENT OFFICE.

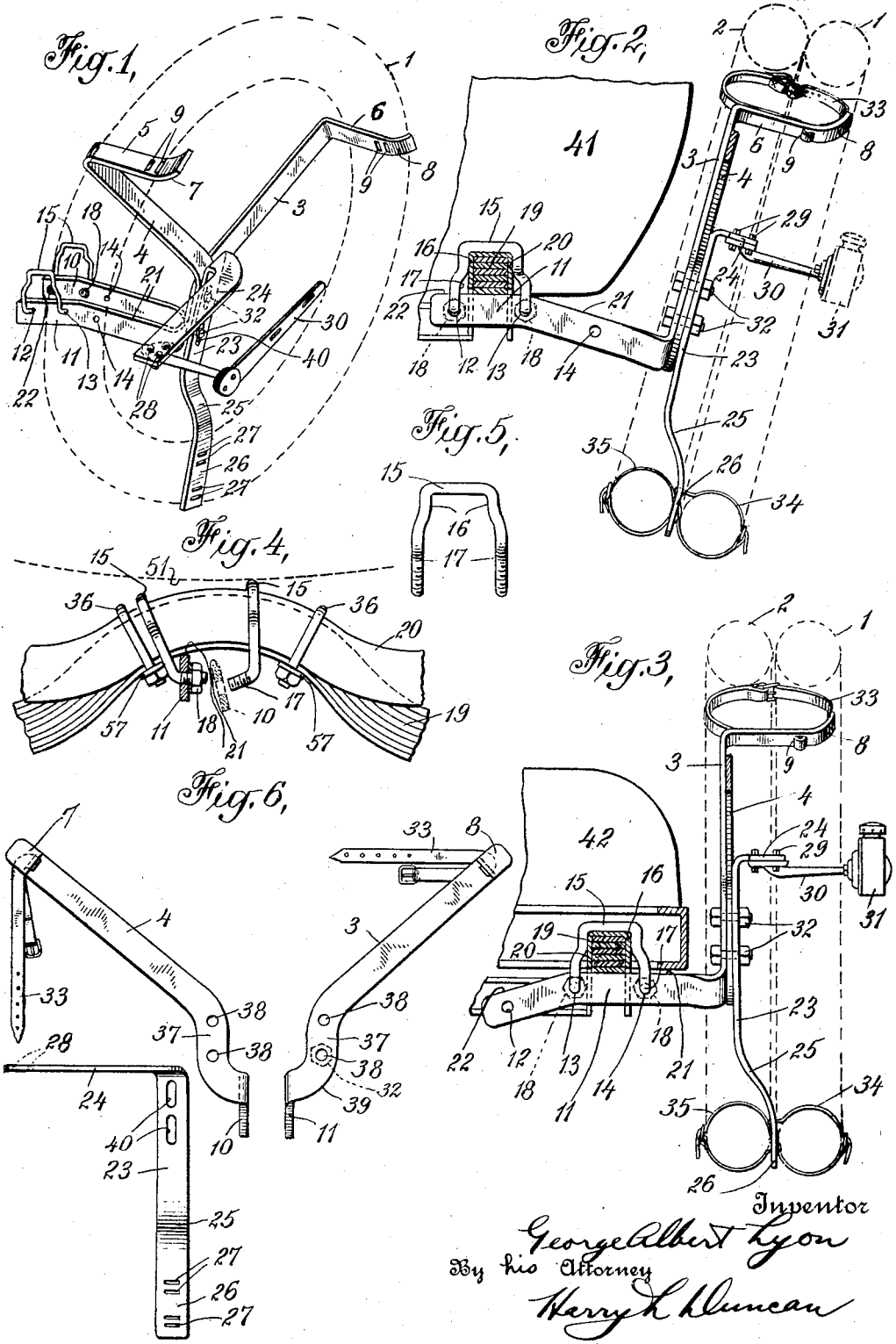

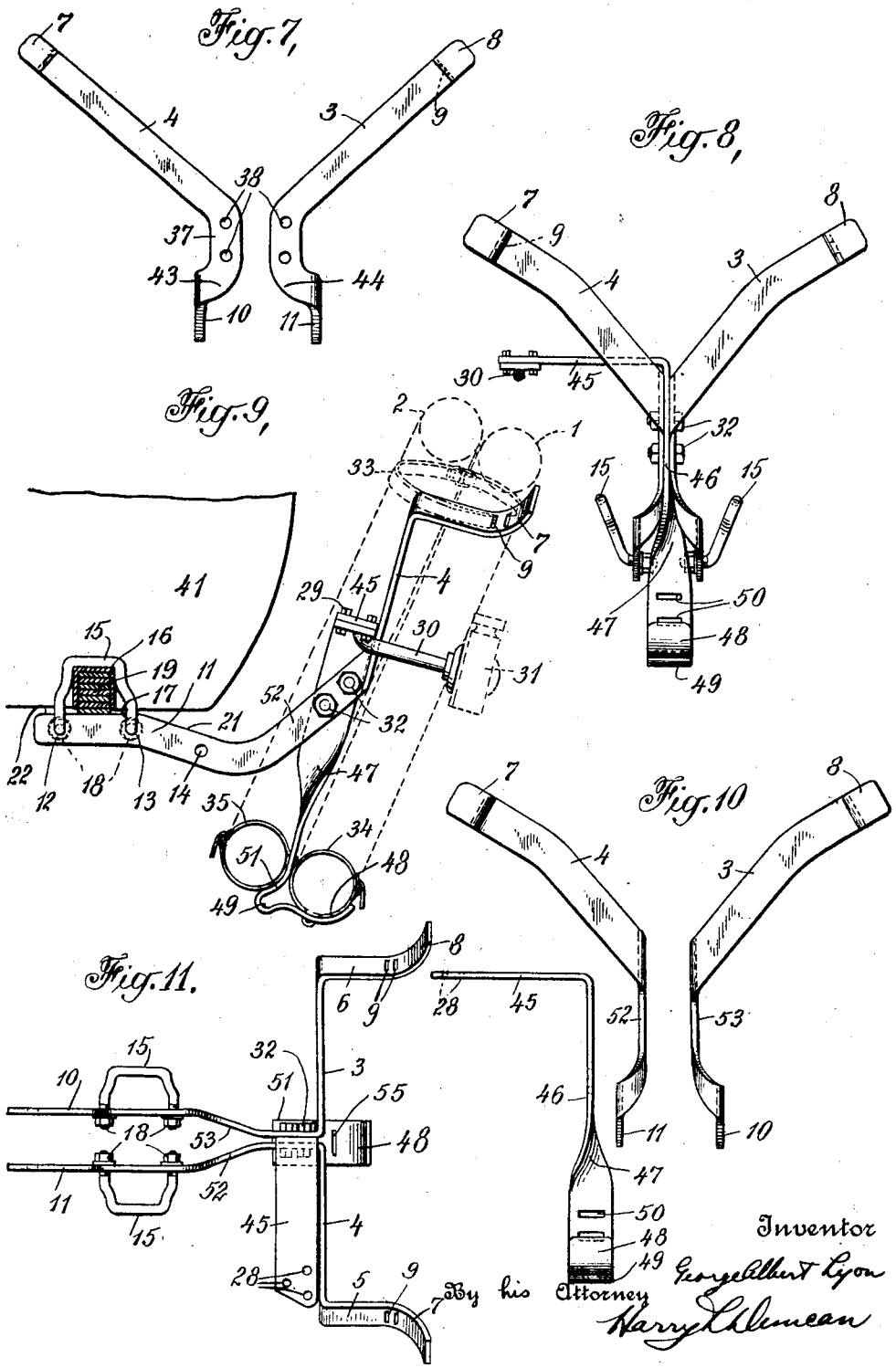

GEORGE ALBERT LYON, OF PHILADELPHIA, PENNSYLVANIA.

AUTOMOBILE-TIRE HOLDER.

1,386,184.  Specification of Letters Patent.  Patented Aug. 2, 1921.

Application filed November 29, 1916. Serial No. 134,060.

*To all whom it may concern:*

Be it known that I, GEORGE ALBERT LYON, a citizen of the United States, and resident of Philadelphia, Philadelphia county, Pennsylvania, have made a certain new and useful Invention Relating to Automobile-Tire Holders, of which the following is a specification, taken in connection with the accompanying drawing, which forms part of the same.

This invention relates especially to tire holders adapted to be used with Ford or other automobiles having transverse rear springs to which the automobile frame or body is secured and comprising or substantially composed of a plurality of flat metal strips having attaching arms or members adapted to be bolted or secured to the rear springs of the automobile so that the tire holder can either be mounted in substantially vertical position close to the rear axle on runabouts or farther away from the rear axle, and in more inclined position on Ford touring cars. The flat strips preferably of spring steel or other resilient material may be provided with overlapping junction portions located substantially centrally of the tire and upwardly extending divergent tire supporting arms may extend from these junction portions and be provided with tire brackets preferably having curved sockets to support the tire at its upper portion in connection, if desired, with retaining members or straps. A tire holding arm may also be bolted or otherwise secured to the junction portions and have a depending member laterally engaging the tire which may be strapped or otherwise secured thereto and an upward and lateral extension of this tire holding arm may extend laterally above the junction portions so as to have the license and lamp bracket bolted thereto.

In the accompanying drawings showing in a somewhat diagrammatic manner illustrative embodiments of this invention, Figure 1 is a perspective view showing one form of the tire holder when assembled but not secured to the vehicle.

Fig. 2 is a side sectional view of the same as secured to a Ford or similar touring car.

Fig. 3 is a similar view of the same when secured to a Ford or similar runabout automobile.

Fig. 4 is a rear detail view showing the attachment of the holder to the rear springs.

Fig. 5 is a detail showing the clamping attaching bolts which may be used.

Fig. 6 is an elevation showing the parts of the tire holder in separated position.

Fig. 7 is a similar view of the two main members of a modified form of tire holder.

Fig. 8 is a rear elevation of still another form of tire holder when assembled.

Fig. 9 shows the same when secured to a touring car.

Fig. 10 is an elevation of this form of holder with its parts separated; and

Fig. 11 is a top view of the assembled holder shown in Fig. 8.

This tire holder may comprise a pair of flat resilient strips which are preferably of tempered spring steel and to secure the maximum of strength and stiffness with minimum weight these strips are preferably made quite wide as compared to their transverse thickness, strips of about an inch and a half or two inches wide and a quarter or three-eighths of an inch thick giving good results. These strips are preferably provided with integral attaching arms to be attached or clamped to the automobile and good results can be secured by clamping the upper bearing faces of these strips beneath the rear spring of the machine. For this purpose the attaching arms 10, 11 are formed with bearing faces 21 which as indicated in Fig. 3 are adapted to be clamped directly underneath the rear spring 19 of the machine as by suitable clamping U-bolts 15 passing around the spring and its channeled frame member 20 so as to securely hold the tire holder in desired position. These bearing faces 21 of the attaching arms are preferably substantially perpendicular to the body of the tire holder or the tires to be secured thereon, so that when these bearing faces are clamped against the rear springs of a runabout the tire holder and tires are supported in substantially vertical position, as shown in Fig. 3. The attaching arms are, however, provided with downwardly bent extensions having alined bearing extension faces 22 thereon so that, if desired, these bearing extensions 22 may be clamped directly beneath the rear spring of a touring car so as to support the tire holder in inclined position farther from the spring, as is shown in Fig. 2.

The clamping means used in this connection may comprise a pair of U-bolts, such as 15, preferably having their upper arms 16 adjacent the transverse member thereof more closely spaced together, as indicated in Fig. 5, so as to closely embrace the spring and its channeled frame member 20 while the lower parts of the bolt arms or shanks adjacent their free ends are more widely separated so as to more readily pass over the spring U-bolts 36. Thus in assembling the device these attaching bolts pass more readily over the spring U-bolts 36 shown in Fig. 4. The attaching bolts are preferably formed with angular threaded extensions 17 adapted to pass through attaching holes 13 and 12 or 14 in the attaching arms and when the nuts 18 are screwed home as indicated in Fig. 4 a wedging toggle joint action is secured which powerfully wedges the bearing faces 21 of the attaching arms against the under side of the rear spring so as to securely hold the tire holder in the desired position. These parts may be advantageously assembled by first slipping one of the attaching U-bolts over the spring U-bolt 36 from the outside of the machine and then when the U-bolt is turned down from its more horizontal inserting position one of the attaching arms 11 may be put in place, so that the ends 17 of the U-bolt pass through the desired pair of attaching holes and then the nuts 18 may be lightly screwed on so as to hold the attaching arm in place, but preferably not tightly clamping it in position until the other parts of the tire holder have been assembled. Then the other attaching bolt may be slipped over the spring and swung down into some such nearly vertical position as is indicated in Fig. 4 so as to allow the attaching arm to be slipped over the bolt ends and then the nuts are started on and the bolt thrown back into its inclined position, so that it abuts against the transverse spring bar 57 on that side which maintains its lower end in alinement therewith while its upper end is located between the spring U-bolt 36 and the adjacent portion 51 of the automobile body. The nuts are preferably then tightened just sufficiently to hold the parts together while still allowing both the attaching arms considerable freedom of movement so that the parts of the tire holder can be properly bolted together. The upwardly bent junction portions 37 of the spring members are brought face to face and bolted together, preferably after putting in place the junction portion 23 of the depending tire holding arm, a couple of junction or connecting bolts 32 securing these junction portions tightly together so that their flat faces are definitely held in desired alinement. The tightening of these junction bolts determines the desired relative position of the parts of the tire holder and then if the attaching bolts are subsequently tightened the attaching arms are rigidly and securely clamped in position under the rear spring of the automobile so as to hold the entire tire holder in desired position.

As indicated in Figs. 1, 2 and 6, the spring strips extending rearwardly from the points of attachment are preferably bent toward each other and upward into a plane substantially perpendicular to the adjacent parts of the attaching arms so as to form the flat junction portions where the two strips cross each other in this cross-over or saw-horse type of the device, the upper extensions of the strips preferably forming the upwardly diverging tire supporting arms which may be located in substantially the same plane as the junction portions and extend substantially radially from about the central part of the tire at angles of about 120 degrees, more or less, apart. The upper ends of these arms may be bent backward to form the tire brackets 5, 6 which may extend at about right angles to the plane of the junction portions of the strips, and if desired, be formed at their ends with curved sockets 7, 8 so as to substantially accommodate the tire as indicated in Fig. 3. The depending tire holding arm 25 may have its junction portion 23 substantially flat and provided with holes or slots 40 adapted to coöperate with the junction holes 38 in the other junction members 37, so that two junction bolts 32 securely hold all of these parts together and support the lower end 26 of this tire holding arm which is preferably offset to the desired extent in such position that as shown in Fig. 2 it may extend between two tires and laterally support either one of them. The tires may be secured to the tire brackets and arm in any suitable way, as for instance, by retaining straps 33 which may be looped through the slots 9 in the tire brackets and extended around the tires 1, 2 which are indicated in dotted lines in Fig. 2. Similar retaining straps 34, 35 may be threaded through the slots 27 in the lower end of the holding arm 25 so as to be strapped around the lower ends of the tires and hold each one of them yieldingly against the face of the arm while still allowing a considerable amount of vertical play and thus readily accommodating either of the slightly different tires used on the front and rear wheels of the automobile, as shown in Fig. 2. It is desirable to have the depending holding arm provided with an upper and lateral extension 24 forming a lamp supporting arm and provided with suitable holes 28 through which may extend the bolts 29 clamping in position the bracket 30 of the lamp 31 shown in Fig. 2 and as indicated in Fig. 1 the lamp bracket may have a laterally extending license bracket to which the usual license plate may be clamped. The lamp supporting arm 24 may, if desired, be bent into such position as to support the lamp 31 in substantially vertical position on either the runabout or touring car and although not necessary in all cases this supporting arm may be so bent that the lamp is supported vertically when the tire holder is mounted on a touring car, as shown in Fig. 3, the supporting arm being for this purpose arranged substantially perpendicular to the junction portions of the strips.

Fig. 7 shows a modification of the main flat spring members in which the junction portions 43, 44 are bent up at right angles to the attaching arms 10, 11 and then the tire supporting arms 3, 4 bent in outwardly diverging position on the same side of the junction portion 37 as the attached supporting arm. This gives substantially the same strength and rigidity as the cross-over or saw-horse type of strips shown in Figs. 1 and 6, although this saw-horse type is somewhat more desirable for packing and transportation, since the members are more nearly in the same plane, so that they make a somewhat smaller package. It is of course understood that in either of these forms of tire holder the length of the attaching arms is slightly different on the two sides of the device, since as shown in Figs. 1 and 2 the attaching arm 11 is somewhat shorter because its junction portion is clamped in front of the junction portion of the other attaching arm 10 which must thus be a quarter of an inch or so longer to bring the attaching holes and the ends of the arms into proper alinement.

Another form of the tire holder is shown in Figs. 8 and 9 as comprising a pair of flat metal strips of resilient spring steel, if desired, comprising similar attaching arms 10, 11 having the two attaching or bearing faces 21, 22 at different angles to suit runabout and touring Ford automobiles to which they may be attached by similar clamping bolts 15 as described. The strips as they extend rearward from these attaching arms are bent together somewhat and formed with upwardly and rearwardly curved portions 52, 53 which as shown in Figs. 8 and 10 are adapted to be clamped together preferably after an interposed depending holding arm 46 has been inserted between them. In this case these junction portions 52, 53 are in substantially the same plane as the attaching arms 10, 11 to which they are secured and the tire supporting arms 3, 4 extended upwardly and outwardly, as shown in Fig. 8, may be formed by bending the flat strips into a perpendicular plane so that these supporting arms are approximately in the plane of the tires or slightly bent forward therefrom, as shown in Fig. 9. These tire holding arms may be formed with similar tire brackets and sockets 7, 8 and the tires may be secured thereto by similar straps such as 33. The depending tire holding arm 46 may be bent through about 90 degrees at the point 47 adjacent its junction surface so that its lower portion is substantially in line with the side of the tire and may be bent more or less under the tire and support the same as by forming therein an alining socket 51 and a bend 49 which holds one tire in position in connection with the strap 35 while a further bend may form the supporting socket 48 in which the other tire 1 may be secured by the strap 34, this supporting socket being preferably somewhat lower than the alining socket so as to accommodate if desired a front tire 1 which would extend downward somewhat farther if its upper portion were supported by the alined tire brackets above. As indicated the depending tire holding arm 46 may have its upper part bent laterally to form a lamp supporting arm 45 having bolt holes 28 therein so that the bolts 29 may clamp a lamp and license bracket 30 thereto as previously described.

It will be seen that with this arrangement the tire holder may be composed of flat spring steel strips which may be readily shipped in compact form and may be readily and securely clamped in extended position by practically any one so as to secure a strong and rigid though light supporting device which may be quickly and easily clamped in rigid position on the vehicle as by wedging the bearing faces of the attaching members beneath the rear spring thereof. In the forms of the device shown in Figs. 1 to 7 the attaching arms have the spring strips vertically arranged so that these arms are vertically rigid where the greatest bending strain occurs and the transversely extending junction portions of these strips and the tire supporting arms forming extensions thereof are in such position as to be securely connected and coöperate most readily with the tires engaging the brackets on these arms. In the other form of the device the flat spring strips are still stronger and stiffer because they are vertically arranged and therefore more rigid at the junction portions, although they do not have quite so pleasing or symmetrical an appearance and are not quite so desirable for packing and shipping. These arrangements are also highly desirable because they can readily be so securely clamped to the automobile and have their parts so rigidly connected that rattling and looseness under running conditions is greatly minimized. The small number of parts of the device is an added advantage and the arrangement of the attaching arms and clamping devices therefor is highly desirable, since as indicated in Figs. 1 and 4 the clamping arms are firmly held apart by the connecting bolts after the device has once been assembled, so that the parts of these attaching arms which coöperate with the attaching bolts 15 are rigidly held outward against these bolts which are between the body of the automobile and the spring bars 57, so that the tire holder is securely supported by the wedging of these parts even though the attaching nuts 18 become loosened or lost.

This invention has been described in connection with a number of illustrative forms, proportions, parts, materials, arrangements and sizes, to the details of which disclosure the invention is not of course to be limited, since what is claimed as new and what is desired to be secured by Letters Patent is set forth in the appended claims:

1. In a tire holder adapted for use with an automobile having a transverse rear spring to which the automobile body is secured, a pair of flat strips having considerably greater width than thickness and each having vertically rigid attaching arms and a junction member at substantially right angles thereto, there being upwardly extending tire supporting arms on said strips beyond said junction members and in substantially the plane thereof, rearwardly turned tire brackets formed integral on the ends of said tire supporting arms and a depending tire holding arm having a junction portion to coöperate with the junction members of said strips, said attaching arms having a plurality of sets of bearing faces, one set of bearing faces adjacent said junction members being adapted to engage the under side of the rear spring of a runabout automobile to support the tire holder in substantially vertical position, and extension bearing faces on said attaching arms in front of said bearing faces and adapted to engage the rear spring of a touring car automobile and support the tire holder in inclined position farther to the rear of said spring.

2. In automobile tire holders, a pair of tire supporting arms substantially in the plane of the tire to be supported and having overlapping junction portions substantially centrally located with respect to said tire, tire brackets on the said supporting arms, a coöperating depending tire holding arm having a junction portion to be removably secured to said junction portions of said tire supporting arms to rigidly connect said arms, integral forwardly projecting attaching arms on said tire supporting arms beyond the junction portions thereof and projecting on opposite sides of said junction portions from the attached tire supporting arms to form a crossing connection, said attaching arms having a plurality of bearing faces arranged at different angles and distances from said junction portions and means adapted to removably hold said bearing faces in engagement with a rear frame member of an automobile.

3. In automobile tire holders, a pair of spring strip tire supporting arms substantially in the plane of the tire to be supported and having overlapping junction portions substantially in said plane and substantially centrally located with respect to said tire, rearwardly bent integral tire brackets having curved sockets formed on the outer ends of said supporting arms, a coöperating depending tire holding arm having a junction portion to be removably bolted to said junction portions of said tire supporting arms to rigidly connect said arms and integral forwardly projecting vertically rigid attaching arms on said tire supporting arms beyond the junction portions thereof.

4. In automobile tire holders, a pair of tire supporting arms substantially in the plane of the tire to be supported and having overlapping junction portions substantially in said plane and located within said tire, integral tire holding brackets formed on the outer ends of said supporting arms, a coöperating depending tire holding arm having a flat junction portion to be removably bolted to said junction portions of said tire supporting arms to rigidly connect said arms and integral forwardly projecting vertically rigid attaching arms on said tire supporting arms beyond the junction portions thereof and projecting on opposite sides of said junction portions from the attached tire supporting arms to enable said arms to fold compactly when disconnected.

5. In automobile tire holders, a pair of tire supporting arms substantially in the plane of the tire to be supported and having overlapping junction portions substantially in said plane and located within said tire, tire holding brackets formed on the outer ends of said supporting arms, a coöperating depending tire holding arm having a flat junction portion to be removably bolted to said junction portions of said tire supporting arms to rigidly connect said arms and integral forwardly projecting vertically rigid attaching arms on said tire supporting arms.

6. In automobile tire holders, a pair of tire supporting arms substantially in the plane of the tire to be supported and having overlapping junction portions substantially in said plane and located within said tire, tire holding devices formed on the outer ends of said supporting arms, a coöperating depending tire holding arm having a flat junction portion to be removably bolted to said junction portions of said tire supporting arms to rigidly connect said arms and forwardly projecting vertically rigid attaching arms secured to said tire supporting arms.

7. In automobile tire holders, tire supporting members and connected vertically rigid and horizontally yieldable attaching arms having attaching holes and bearing faces adapted to be clamped edgewise against the rear spring of an automobile and support the tire holder therefrom and attaching U-bolts having laterally bent threaded shanks adapted to encircle the rear spring and pass inward through the attaching holes in said attaching arms to securely and wedgingly clamp said attaching members to said spring.

8. In automobile tire holders, a plurality of spring strip tire supporting and holding arms having flat lapping junction portions located within the tires to be supported and adapted to be removably and rigidly bolted together, a plurality of said arms being provided with integral forwardly extending vertically rigid attaching arms adapted to be clamped to an automobile.

9. In automobile tire holders, a plurality of spring steel flat strip tire supporting and holding arms having flat lapping junction portions located within the tires to be supported and adapted to be removably and rigidly bolted together, and a plurality of connected forwardly extending vertically rigid spring strip attaching arms to be removably secured to an automobile and strap retaining members extending through apertures in said arms to engage said tires.

10. In automobile tire holders, tire supporting members and connected resilient vertically rigid and horizontally yieldable attaching arms having bearing faces adapted to be clamped edgewise against an automobile and support the tire holder therefrom, each of said attaching arms having a second bearing face arranged at an angle to the first, and said bearing faces being arranged at different distances from the point of connection of the arms and supporting members.

11. In automobile tire holders, a pair of tire supporting arms substantially in the plane of the tire to be supported and having overlapping junction portions substantially in said plane and located within said tire, tire holding devices formed on the outer ends of said supporting arms, a coöperating depending tire holding arm having a flat junction portion to be removably bolted to said junction portions of said tire supporting arms to rigidly connect said arms and forwardly projecting vertically rigid attaching arms secured to said tire supporting arms, said attaching arms having a plurality of bearing faces arranged at different angles and distances from said junction portions.

GEORGE ALBERT LYON.

Witnesses:
JESSIE B. KAY,
CATHERINE B. MULCAHY.